Feb. 18, 1936.   D. W. WINZELER   2,031,141
FASTENING TOOL HANDLE
Filed June 14, 1934
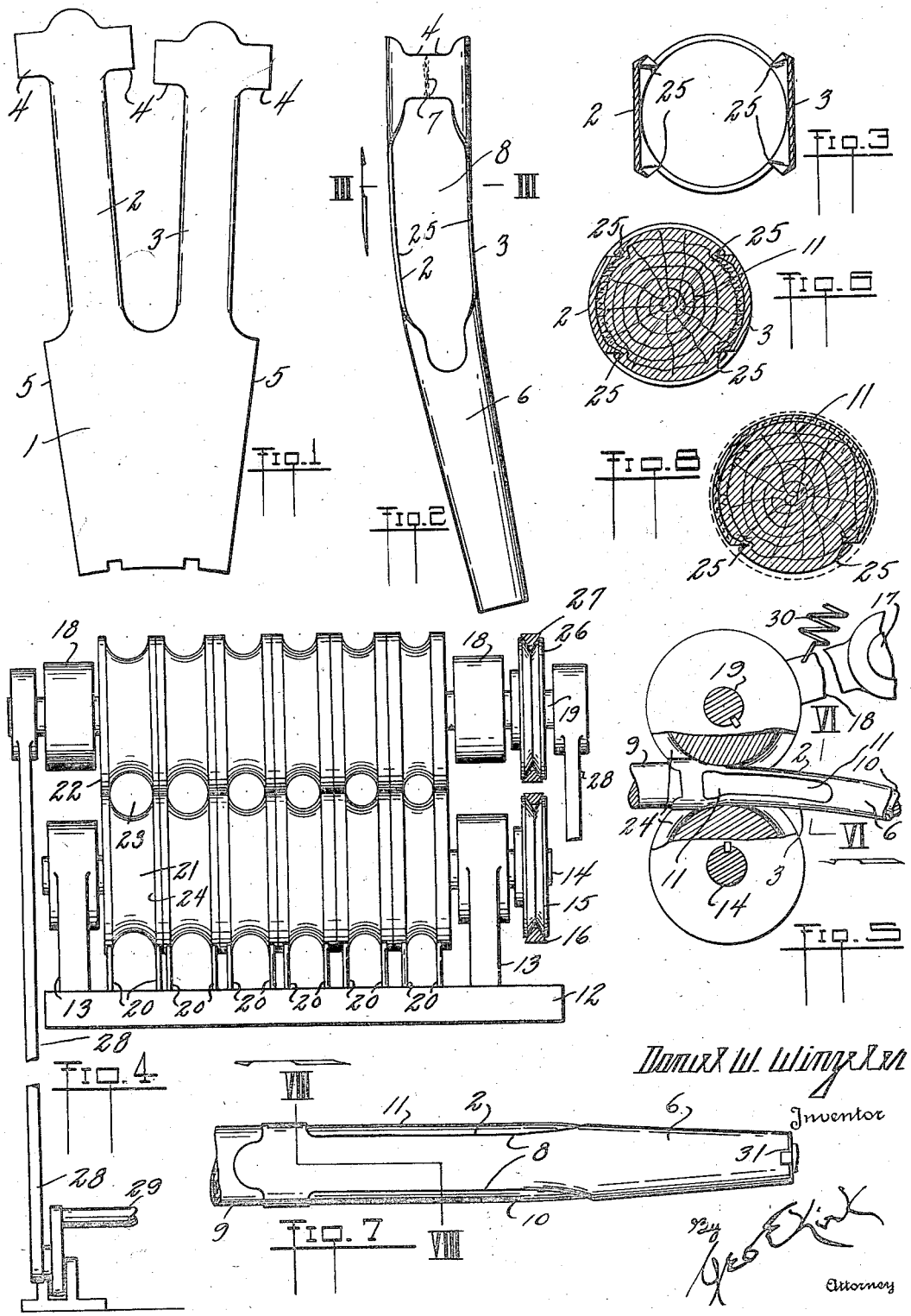

Patented Feb. 18, 1936

2,031,141

UNITED STATES PATENT OFFICE 2,031,141

FASTENING TOOL HANDLE

Daniel W. Winzeler, Montpelier, Ohio

Application June 14, 1934, Serial No. 730,641

1 Claim. (Cl. 306—29)

This invention relates to metallic trim or terminal reinforcement of handles.

This invention has utility when incorporated in ferrule mounting of wood handles for tools.

Referring to the drawing:

Fig. 1 is a view of a bank in accordance with an embodiment of the invention;

Fig. 2 is a view of the ferrule formed from the blank of Fig. 1;

Fig. 3 is a section on the line III—III, Fig. 2;

Fig. 4 is a view of a roller press for completing assembly of the ferrule of Fig. 2 with a wood handle;

Fig. 5 is a fragmentary view of a wood handle having the ferrule assembly therewith effected by the press of Fig. 4;

Fig. 6 is a section on the line VI—VI, Fig. 5;

Fig. 7 is a view of the assembled ferrule and handle of Fig. 5; and

Fig. 8 is a section on the line VIII—VIII, Fig 7.

Sheet metal blank is shown with body portion 1 having tongues 2, 3, therefrom. The free ends of these tongues are shown as having lateral extensions 4. This blank is formed into a ferrule by having weld assembly of edges 5 of the body portion, thereby forming tapered tubular portion 6, from which extend the tongues 2, 3, with the lugs 4 having weld 7 completing such as a spacing means or ring for the free ends of the tongues and leaving open work 8 between the tongue termini as remote from the tapered body portion 6 of the ferrule.

Wood handle 9 having tapered portion 10 may have such tapered portion telescope into the tapered portion 6 of the ferrule for fitting assembly therewith. The tongues 2, 3, as well as the rings 4, 7, are of an extension from the body portion of the ferrule and desirably do not conform in shape or dimension with cylindrical portion 11 of the handle 9 as extending from its tapered portion 10.

In carrying out the invention herein, base 12 is shown mounting brackets 13 providing fixed bearings for shaft 14 having pulley 15 thereon driven by belt 16. Mounted on bearing 17 fixed with the base 12 are links 18 providing bearings for shaft 19 in parallelism with the shaft 14. The base 12 is shown provided with diameter gages 20 at respective grooved roll pairs 21, 22, on the shafts 14, 19. In practice, say in wood handles for shovels, these gages 20 may vary, say $\frac{1}{32}$ of an inch. If the sheet metal for the ferrule be say twenty gage, at the gage 20 for the diameter 11 of the wood handle 9, as determined by the operator, position is located. For such wood handle proper assembly of ferrule therewith, it is desirable to select, with gage No. 20 metal, $\frac{1}{32}$ inch larger diameter. This would be to the left, as the graduation is shown in Fig. 4, as the one wherein there is to be inserted the handle terminus 10 from which the cylindrical portion 11 extends.

With this pair of rolls 21, 22, rotating away from the operator at their portions toward each other, this terminus 10 may be inserted in clearance region 23 with roll flanges 24 first acting at diametrical portions to roll reduction in diameter at this region approximating parallelism with the shafts 14, 19, and this reduction progresses therefrom as the stock moves into the plane of the pair of shafts 14, 19. The tongues 2, 3, have marginal offsets 25 embedded in the wood of the handle 9 as the rollers 21, 22, progress the ferrule therebetween in changing from oval to cylindrical form.

As the ring 4, 7, comes into the region of reduction, there is peripheral collapsing, which in practice seems to compact the metal generally throughout the cylindrical region, even with absence of puckerings or irregularities. Due to these spacings between the free ends of the tongues 2, 3, the diametrical relationship of the tongues is held against shifting and there is thus accurate location thereof on the handle as the collapsing of this ring into partial or semi-embedding relation with the wood of the handle occurs. This effects an anchorage against axial shifting of the ferrule as to the wood handle and it is an anchorage effected in a single operation with accuracy in form and fitting independently of weakening the stock of the wood as by perforation.

On the shaft 19 is pulley 26 to be driven by belt 27 so that both shafts 14, 19, are alive or driven shafts in urging the stock through for the collapsing or assembly herein set forth. From this shaft 19 links 28 may extend to treadle lever 29, depression of which against the action of springs 30 brings the clearances 23 into true circle form, while release of the treadle 29 causes the springs 30 to increase the spacing from the shaft 19 to the shaft 14, thus freeing the formed article from the device so that the operator may readily remove such therefrom. The wood handle 9 with the ferrule compacted therewith as to the portions away from the tapered region is thus an effective terminal trim and reinforcement which may have a terminal keying 31 for receiving tang of a tool, such as a fork, spade, hoe, or similar device.

The departure from fitting form of the extensions 2, 3, 4, from the tapered sleeve 6 permits ready slipping of the tapered portion 6 into snug seat-fitting with the tapered portion 10 of the handle 9, even about the bend in the handle between the portions 10, 11. The roll collapsing effecting the embedding of the tongue edges 24 and the ring 4 is a bringing of this departure-from-fitting portion into snug, conformed assembly, even against weathering attack for the handle at such joining. This holding is of tightness even resisting loosening at expansion and contraction from heat as to the metal or moisture as to the wood in such degree that there is no weakening, but this embracing to conform is a substantial reinforcement of the wood eliminating any weakening regions for the handle as toward the tool.

The rolling reduction in bringing the extension from the tapered portion into fitted configuration with the wood handle produces an assembly which even as exposed to weathering does not have rough edge or margin projections tending to wound the hand of the operator or tear or unduly wear the hand coverings of the operator.

What is claimed and it is desired to secure by Letters Patent is:

A sheet metal ferrule of symmetrical outside and inside contour throughout, said ferrule comprising a tapered, annularly complete, tubular section; axially spaced therefrom an additional exteriorly and interiorly annularly-continuous, complete cylindrical section; and approximately parallel independent laterally spaced tongues integral with and connecting said sections providing openings between the sections, said openings being parallel and spaced by the tongues.

DANIEL W. WINZELER.